United States Patent
Bovo et al.

(10) Patent No.: US 7,289,454 B2
(45) Date of Patent: Oct. 30, 2007

(54) NON-INVASIVE ESTIMATION OF ROUND TRIP TIME A PACKET-ORIENTED ACKNOWLEDGE-BASED TRANSMISSION SYSTEM

(75) Inventors: Antonio Bovo, Padua (IT); Edoardo Rizzi, Cavizzana (IT); Luca Martello, Adria (IT); Ronny Tittoto, Paderno del Grappa (IT); Matteo Bertocco, Novents Padovanna (IT); Claudio Narduzzi, Mirano (IT); Alessio Biasutto, Mestre (IT)

(73) Assignee: Tektronix, Inc., Beaverton, OR (US)

( * ) Notice: Subject to any disclaimer, the term of this patent is extended or adjusted under 35 U.S.C. 154(b) by 819 days.

(21) Appl. No.: 10/728,204

(22) Filed: Dec. 3, 2003

(65) Prior Publication Data

US 2004/0133391 A1 Jul. 8, 2004

(30) Foreign Application Priority Data

Sep. 12, 2002 (EP) ................................ 02 027 399

(51) Int. Cl.
*G01R 31/08* (2006.01)
(52) U.S. Cl. ...................................... 370/252; 709/224
(58) Field of Classification Search ................ 370/252, 370/253, 232, 519; 709/224, 223, 235
See application file for complete search history.

(56) References Cited

U.S. PATENT DOCUMENTS

| 5,521,907 | A | * | 5/1996 | Ennis et al. ................. 370/253 |
| 5,612,949 | A | * | 3/1997 | Bennett ...................... 370/253 |
| 5,867,483 | A | * | 2/1999 | Ennis et al. ................. 370/252 |
| 6,831,890 | B1 | * | 12/2004 | Goldsack et al. ........... 370/229 |
| 7,123,589 | B1 | * | 10/2006 | Dawes et al. ............... 370/248 |
| 2002/0174216 | A1 | | 11/2002 | Shorey et al. |
| 2004/0057379 | A1 | * | 3/2004 | Chen et al. ................. 370/235 |
| 2006/0007863 | A1 | * | 1/2006 | Naghian ..................... 370/238 |

FOREIGN PATENT DOCUMENTS

EP 1206067 5/2002

* cited by examiner

*Primary Examiner*—Ricky Q. Ngo
*Assistant Examiner*—Benjamin Su
(74) *Attorney, Agent, or Firm*—Francis I. Gray

(57) ABSTRACT

A method of non-invasive estimation of round trip time (RTT) between a sender and receiver in a packet oriented acknowledgment based transmission system uses a probe to monitor signals transmitted between the sender and receiver at any point in the transmission system. For a presetable number of acknowledgments in a sequence of acknowledgments received by the probe within a time interval, the time stamps of the acknowledgments are compared (i) with the timestamps of the packets received before the acknowledgments to determine an estimated value for the round trip time between the probe and receiver, and (ii) with the timestamps of the packets received after the acknowledgments to determine an estimated value for the round trip time between the probe and sender. Also sequence numbers of the same group of acknowledgments are compared with the packets encountered to perform a distance function along the sequence numbers themselves. The estimated values for probe-sender and probe-receiver are added to determine the estimation of round trip time between the sender and receiver.

18 Claims, 8 Drawing Sheets

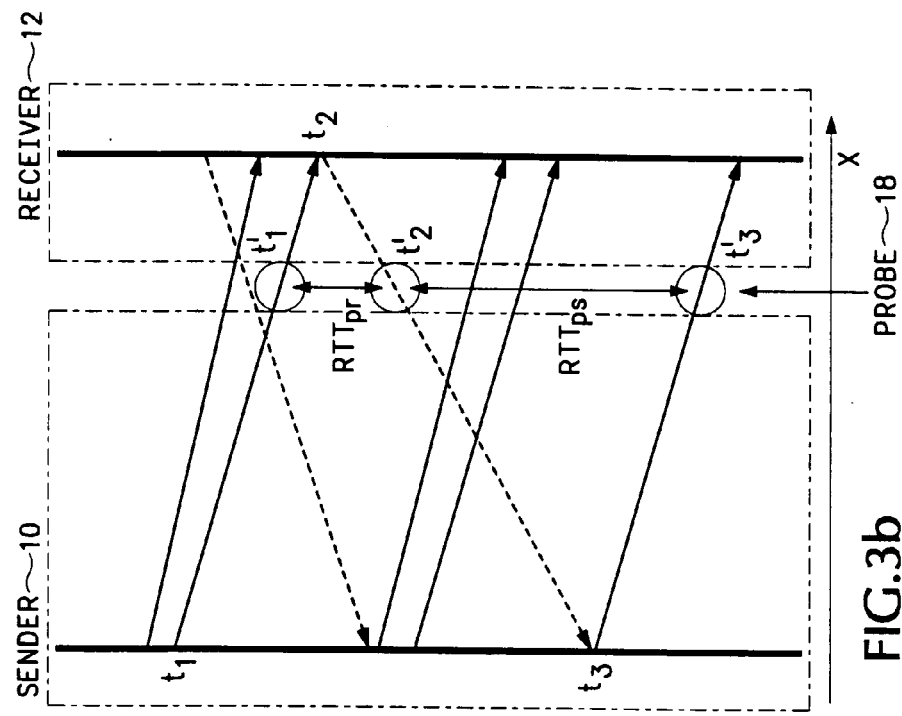
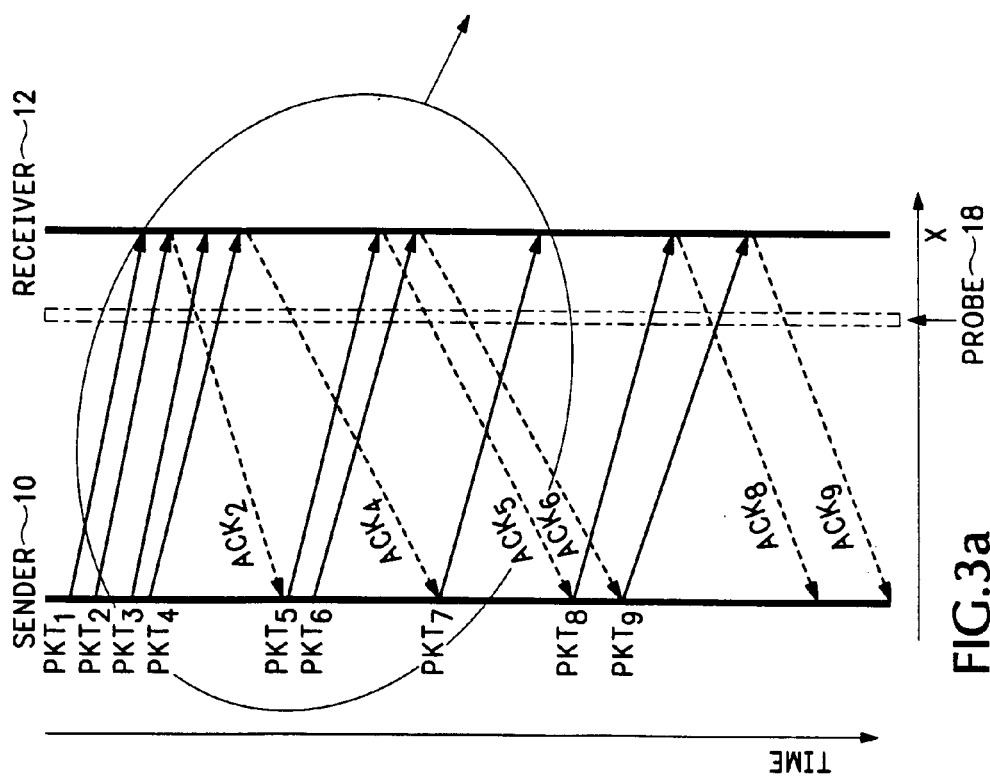
FIG.3b
FIG.3a

NON-INVASIVE ESTIMATION OF ROUND TRIP TIME A PACKET-ORIENTED ACKNOWLEDGE-BASED TRANSMISSION SYSTEM

BACKGROUND OF THE INVENTION

The present invention relates to protocol analysis, and more particularly to a non-invasive estimation of round trip time in a packet-oriented acknowledge-based transmission system using a probe at any point in the system to monitor the signals transmitted between a sender and a receiver.

Currently TCP/IP (Transmission Control Protocol/internet Protocol) is used extensively in Intranet and Internet networks. With new wireless networks, especially the 2.5G and 3G generations, TCP/IP will be the protocol most used worldwide in telecommunications environments. Also TCP/IP should substitute for other protocols that are currently largely used in telecommunications infrastructures. However this large usage of TCP/IP requires the introduction of new measurement processes to characterize the behavior of this protocol and the quality of service (QoS) offered by applications using it. Some characteristics of this protocol should have an impact on the different applications using TCP/IP. A very important parameter is "round trip time" (RTT) that gives a measure of the delay perceived by a user or application sending a packet and receiving a response for it. This parameter is influenced by problems such as queuing delays in the network, erroneous dimensioning or configuration on the part of the network, bottlenecking, etc.

TCP/IP is a protocol that allows reliable data transfer between two terminal hosts. In order to provide reliability, packets that correctly reach the receiver are acknowledged and the sender is informed of the correct delivery. The time that elapses between the sending of the packet and the response provided by the acknowledgment is the RTT. Typically RTT is a measure of "how far" the receiver is from the sender, and gives good information regarding network behavior and quality perceived by users. It is clear that the evaluation of RTT could be performed easily at a sender side, but this point of measure is normally outside the scope of a network operator.

FIG. 1 (upper part) shows a graphic illustrating what is meant by RTT. As shown TCP/IP packets 14 travel from the sender 10 to the receiver 12 and the related acknowledgments 16 follow the inverse path.

To provide better throughput TCP/IP uses a sliding-window transmission algorithm. The sender periodically evaluates a value called congestion window (cwnd). This parameter represents the number of packets transmitted and not already acknowledged. Its value is limited to an advertised window (advwnd) which represents the maximum buffer size used by the receiver.

GPRS (General Packet Radio Service) networks, as a mobile example of a TCP/IP network, are more sensitive to RTT than current Internet networks. This is due to the impact of the radio path on the total TCP/IP path and on the inter-working of the IP environment with the telecommunications switch environment. FIG. 2 shows a typical structure of a GPRS network. A SGSN (Switched General Signal Network) may be defined as the front end between IP protocols and traditional telecommunications protocols, even if TCP/IP is used in a transparent way from the sender (Internet server) to the receiver (GPRS mobile).

GPRS networks provide new access to services over the IP suite. In order to evaluate the quality perceived by users, mobile operators perform a continuous monitoring of the involved devices and lines. Moreover users may access different services not necessarily related to the mobile operator itself. For these reasons SLAs (Service Level Agreements) are stipulated between different network owners, and a continuous monitoring of network behavior ensures the respect of such agreements. Therefore a mobile operator has to be able to perform RTT measures and to separate delays due to its network and to external ones.

If it is possible to monitor TCP traffic at the sender side, RTT evaluation is a simple task. In this case RTT is estimated by calculating the time elapsed between sending a packet and receiving the corresponding acknowledgment. Usually TCP senders evaluate RTT using this simple technique in order to compute the Retransmission Time Out (RTO—see Request for Comments RFC723 p. 41). This technique has some advantages: it is easy to implement and a non-invasive implementation may be realized at the sender side. Its disadvantages are that it can only be applied at the sender side and measurements cannot be performed in the presence of high rates of packet loss. An invasive technique, such as "ping", uses the same technique. This latter solution is well known and widely used in the Internet and other IP networks. In any event it cannot be implemented in order to evaluate network response times perceived by single users. This is due to the fact that packets used by "ping" are typically smaller than the ones used in data transfers. Moreover "ping" does not use TCP, but ICMP (Internet Control Message Protocol).

To perform an RTT evaluation at an intermediate point, another known technique is based on TCP SYN and SYN acknowledgment measurement. This technique evaluates the time delay between particular TCP messages occurring only in certain cases in a TCP connection to setup the connection itself. This solution has the advantage of simplicity as it can perform a single RTT evaluation in a non-invasive manner at any intermediate point. However it cannot perform a continuous monitoring of network performance—it is not possible to track RTT variation during a particular connection. The single evaluation is performed monitoring packets smaller than the ones involved during data transfer and the sender delay is included in the RTT estimation.

What is desired is a method that allows continuous monitoring of network performance and tracking of RTT variation, especially during a particular connection.

BRIEF SUMMARY OF THE INVENTION

Accordingly the present invention provides a method of non-invasive evaluation of round trip time (RTT) between a sender and a receiver in a packet-oriented acknowledge-based telecommunications system that delivers mean values of RTT for groups of packets during a particular connection by continuous monitoring and following of possible variations due to network congestion and radio link delay. The RTT is evaluated by analyzing a group of acknowledgments and their corresponding transmitted packets, instead of analyzing a single acknowledgment and its corresponding packet. A correlation between the acknowledgments and their packets is done looking forward and backward in time. Acknowledgments are sent by the receiver as soon as packets are delivered, while packets are transmitted by the sender after an acknowledgment has arrived. The total RTT is defined by the sum of two different components: the round trip time from a probe to receiver, RTTpr, and the round trip time from the probe to sender, RTTps, where the probe may be coupled to any interface point in the system. For a certain group of acknowledgments RTTpr is evaluated considering the corresponding packets backward in time, and RTTps is evaluated considering the corresponding packets forward in time. The sum of RTTpr and RTTps provides the estimation of RTT. As a result the RTT evaluation is non-invasive and may be performed at any intermediate point as well as at the receiver side, and RTT variations and congestion window variations may be tracked during a particular connection.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIGS. 3a and 3b are a timeline diagram view and an extract of the timeline diagram view according to the present invention.

DETAILED DESCRIPTION OF THE INVENTION

Figure 1:
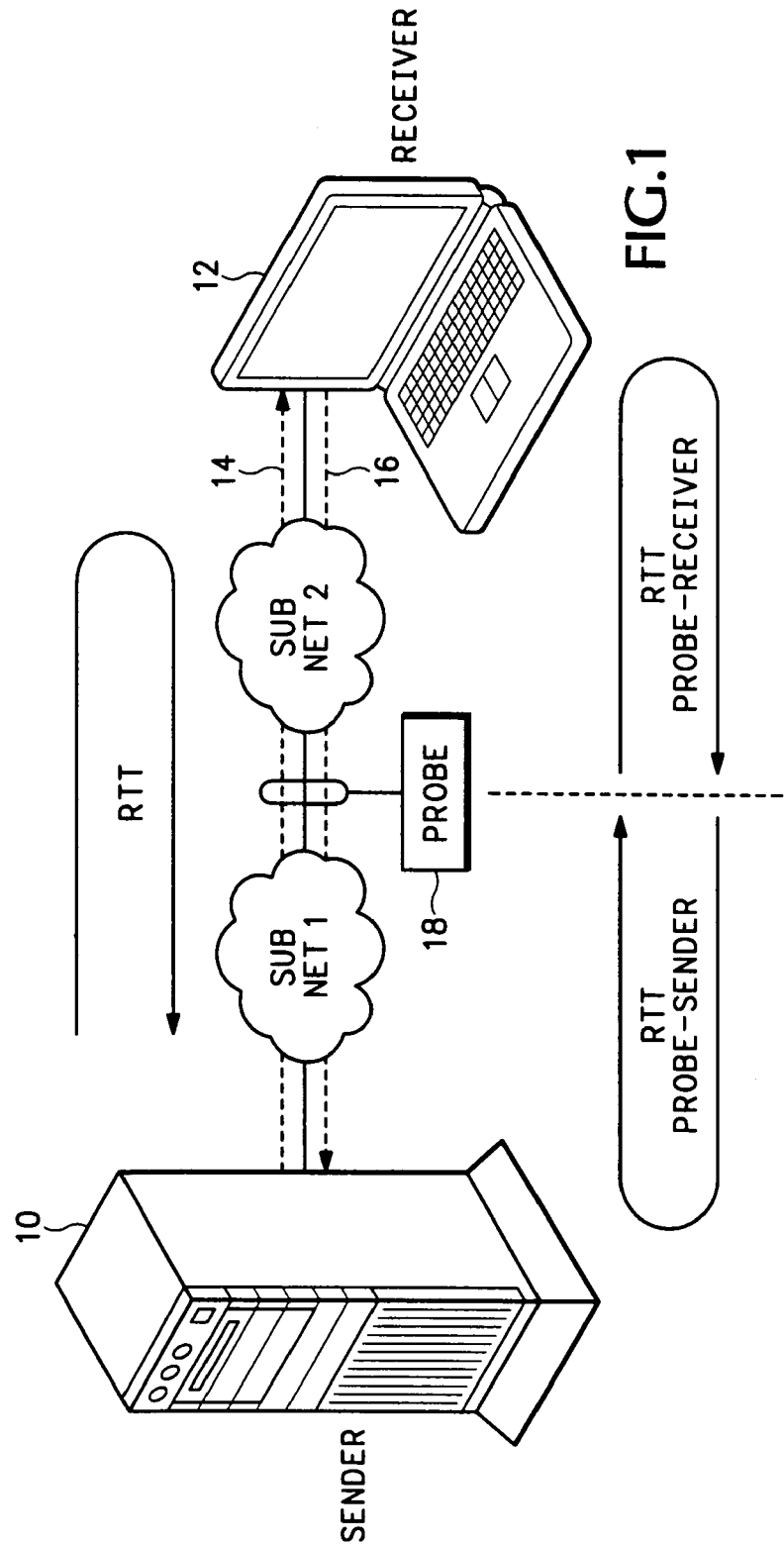
FIG. 1 is a block diagram view of a telecommunications system for illustrating round trip time (RTT) as well as the evaluation of RTT according to the present invention.
Figure 2:
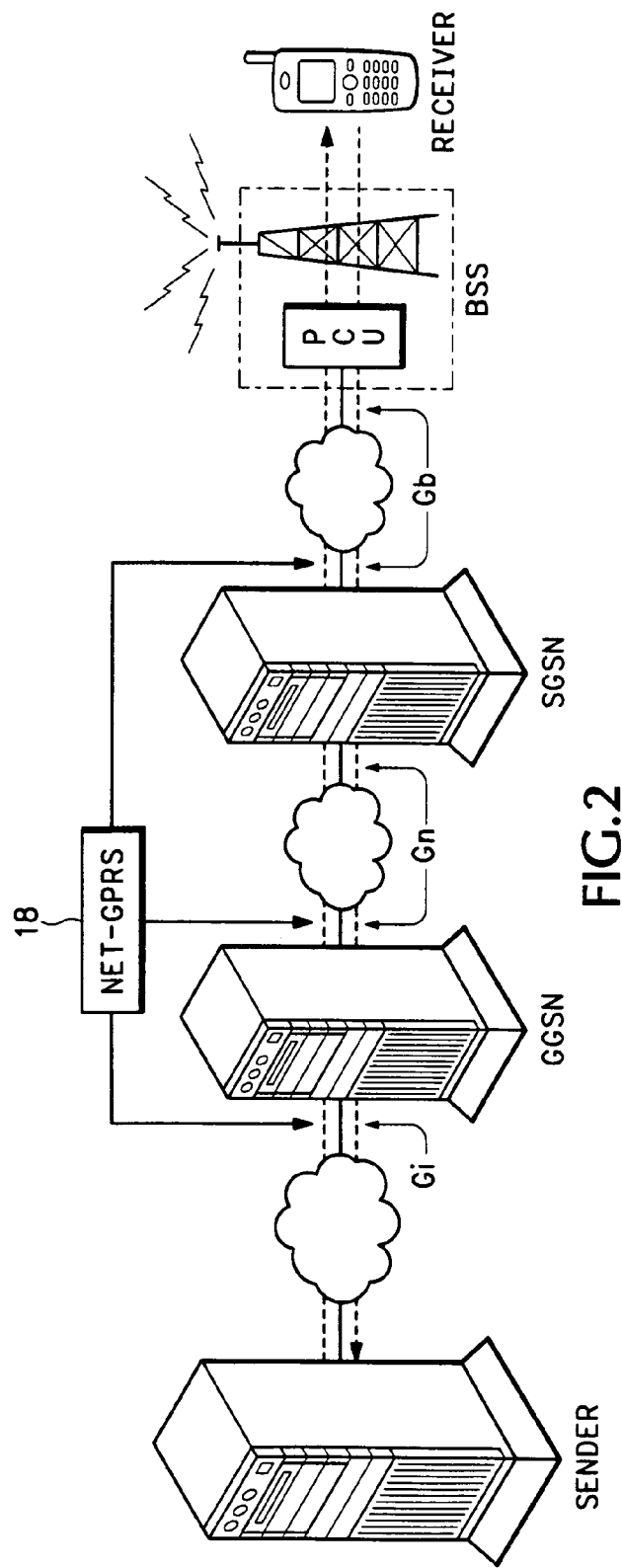
FIG. 2 is a block diagram of a GPRS application and possible locations for monitoring probes according to the present invention.

As indicated above, the upper portion of FIG. 1 illustrates RTT evaluation according to the prior art from the sender side. In the present invention a probe 18 is coupled to point of measure inside a network, which may be any accessible intermediate point such as gateways or typical network interfaces. The detemination of the RTT is performed in two steps: by determining the RTT probe-receiver (RTTpr) and the RTT probe-sender (RTTps) which are then added to determine the entire RTT. FIG. 2 shows examples for the location of the probe 18 at typical GPRS interfaces, such as Gi, Gb and Gn.

Each TCP connection may be described through a timeline diagram, like the one shown in FIGS. 3a, 3b. Time increases in the downward direction and the left and right side vertical lines represent respectively the sender 10 and receiver 12 involved in the connection. TCP packets transmitted from sender to receiver are shown with thick arrows, and acknowledgments are shown with dashed arrows going from the receiver to sender. The TCP connection is probed at an intermediate point where captured packets and acknowledgments travel respectively later and sooner than at the sender side, i.e., a packet starts from the sender 10 at time $t_1$, passes the probe 18 at time $t'_1$, and reaches the receiver at time $t_2$. Also at time $t_2$ an acknowledgment automatically starts, passes the probe at time $t'_2$ and reaches the sender at time $t_3$. The sender is allowed to free new packets depending on the congestion window currently in use, according to the TCP sliding window mechanism, assuming the sender always is filled with packets to be sent, and the packet freed in response to the acknowledgment received at time $t_3$ passes the probe at time $t'_3$.

RTT is equal to $t_3-t_1$ and is evaluated at the probe by estimating $t'_2- t'_1$ and $t'_3-t'_2$ that represent respectively RTTpr and RTTps. As shown in FIGS. 3a and 3b $t'_1$, $t'_2$ and $t'_3$ are timestamps observed at the probe. What is needed is to find the correct sequence of packet, acknowledgment and new packet regardless of the sliding window algorithm implemented by the TCP sender. In fact other packets of the same connection flow between sender receiver during the analysis. RTTpr is evaluated by two separate techniques:

Timestamps (capture time at the probe) of a small group of acknowledgments, such as 4-5, are "moved" back in time in order to find the time sequence of packets that released them at the receiver. This operation is done by a distance function performed along the time series.

Sequence numbers of the same group of acknowledgments are compared with the packets encountered during the described operation in order to perform a distance function along the sequence numbers themselves.

RTTps is evaluated in a similar way, searching which packets have been released at the sender by the acknowledgments considered. In this case a direct correspondence between sequence numbers doesn't exist and a congestion window estimator is used in order to find out. For protocols that do not use variable congestion windows or something comparable, the described method works well up to that point. However further improvement may be achieved for protocols that use variable congestion windows as follows.

In TCP connections acknowledgments are generated by the arrival of packets and packets are freed by the arrival of acknowledgments. First the timestamp procedure tries to find the most probable sequence of packets that has generated the group of acknowledgments considered. In this way RTTpr is evaluated. Likewise the same procedure is used to try to find the packets that have been released by the group of acknowledgments considered—RTTps. The described algorithm performs a mean RTT evaluation for each group of acknowledgments within an acknowledgment time interval, called "Wack", captured at the probe. Typically these groups contain enough acknowledgments to validate the response. RTT is not stable during TCP connection, and it represents the degree of congestion experienced by the sender and receiver. To get better results and not to fail the measurement procedure, the algorithm does not consider too many acknowledgments for each mean RTT evaluation. To resolve these problems a trade-off is found by analyzing real data tracks and finding optimal working values. The algorithm performs each RTT evaluation considering a small time window containing a few acknowledgments. The number of acknowledgments considered preferably is more than 4 and less than 7. The time window may be chosen with a typical value of 2 seconds. A maximum RTT for both directions is given to optimize performance. The worst case value for RTTmax is preferably 5 seconds.

Figure 4:
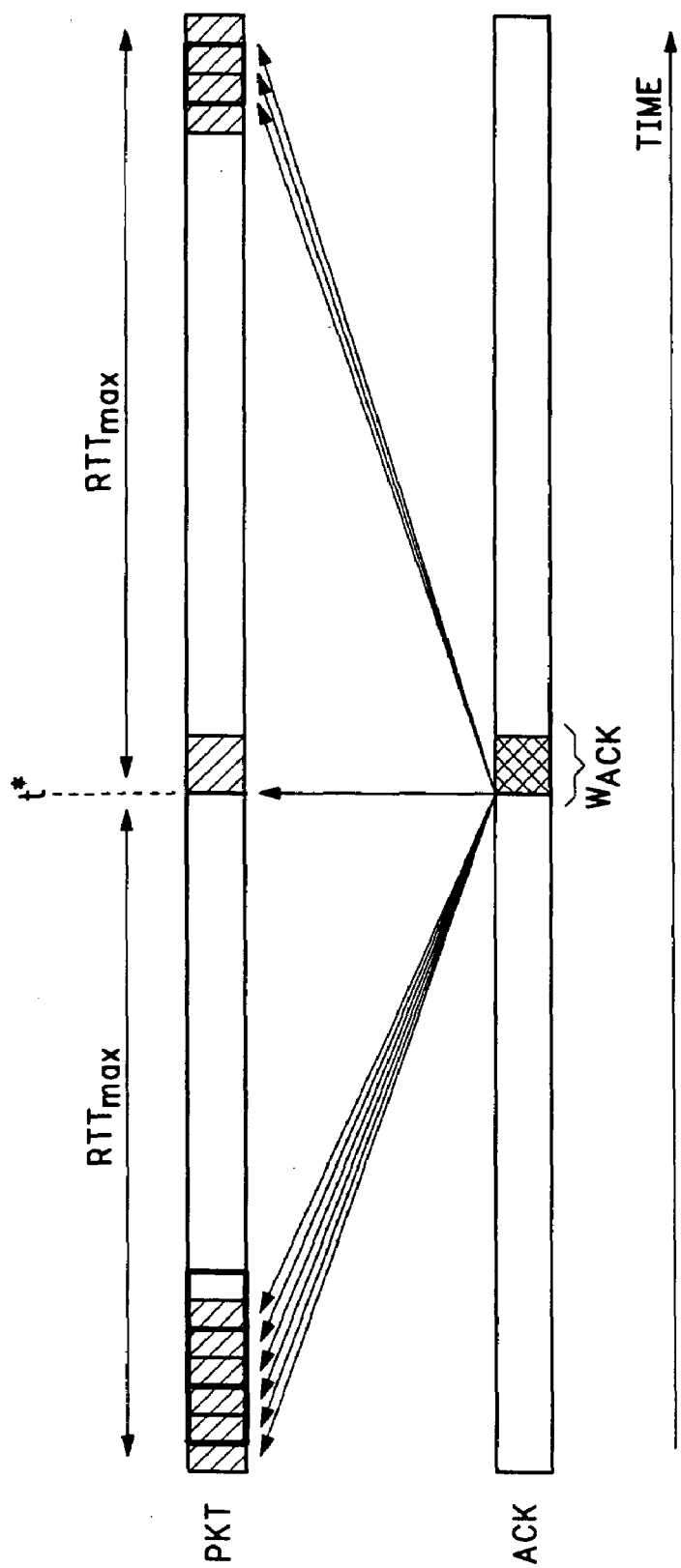
FIG. 4 is a diagrammatic view illustrating the estimation of RTT according to the present invention.

Referring now to FIG. 4 the course in time of the packets (PKT) and the acknowledgments (ACK) are shown. The first acknowledgment considered was received at the probe at time t*. Then the algorithm considers the packets arriving in time before and after t* for this group of acknowledgments. To limit the number of packets to be analyzed, the interval in this example is limited to [t−RTTmax; t*+RTTmax+Wack). Considering the acknowledgments associated with a Wack at time t* (see FIG. 5), their timestamps are compared with packets between t*−RTTmax and t*+RTTmax+Wack. Several distances are computed in this interval "moving"

Wack with a resolution step ris. The left side of FIG. 5 corresponds to the probe-receiver segment and the right side corresponds to the probe-sender segment. "Moving" Wack from left to right means to add an offset to each timestamp of the acknowledgments considered.

To simplify the algorithm description the interval [t*; t*+RTTmax+Wack] is considered. In this time interval RTTps is evaluated. To determine RTTps the packets released by the acknowledgments contained in Wack need to be found. This is performed with a resolution step of ris moving the timestamps of the considered acknowledgments from t* to t*+RTTmax+Wack. At the ith iteration the used timestamp for the nth acknowledgment is:

$$t\_moved\_ack(n) = thd - ack(n) + i*ris$$

where n is the acknowledgment considered, t_ack(n) is its timestamp, t_moved_ack(n) is the "moved" value and i is the index of the iteration. For each iteration i the algorithm computes the mean timestamp distance between the "moved" acknowledgments of Wack and the nearest packets. In pseudo-code these operations are:

```
for i = 0 to N = round(RTTmax/ris) {
  for n = 1 to N_ack {
    - find the packet nearest to t_moved_ack(n);
    - compute dt(n) as the absolute value of the difference
      between the   timestamp of that packet and t_moved_ack(n);
  }
  DT(i) = sqrt(sum(square(dt(n))))/N_ack
}
``` where N_ack is the number of acknowledgments in Wack. The first "for . . . to" loop means "for every resolution step", while the second "for . . . . to" loop means "for every acknowledgment."

To avoid computation load the sqrt function may be omitted since the Minimum of DT(i) is the same as the Minimum of sqrt(DT(i)). However for an easier understanding it is left in the above equation as well as in corresponding equations below.

After all iterations are computed, DT(i) contains the mean timestamp distances for each i. If it is possible to find an $i_1$ such that $DT(i_1)$ is smaller than the DT(i)'s for all other i's, then $$RTTps = i_1 * ris$$

RTTpr is evaluated in the same manner considering the time interval [t*−RTTmax; t*]. Indices are changed slightly in order to search the packets that released the acknowledgments under analysis.

As described above RTTpr and RTTps are obtained searching the minimum values for DT(i). Typically DT(i) has several minimums. To obtain better performance other information contained in packets is used.

In practice an acknowledgment has a sequence number obtained directly from the packet sequence number and the packet size. For the sake of simplicity a direct correspondence may be considered, namely that acknowledgments generated by packets arrived at the receiver side have the same sequence numbers as the packets that generated them.

Thus a second distance may be evaluated with those values. Considering the above pseudo-code a new distance is added:

```
for n = 1 to N_ack {
  - find the packet nearest to t_moved_ack(n);
  - compute dt(n) [see above]
  - compute ds(n) as the absolute value of the difference between the
    sequence    number of that packet and the sequence number of the
    acknowledgement    considered
}
DS(i) = sqrt(sum(square(ds(n))))/N_ack
```

Figure 5:
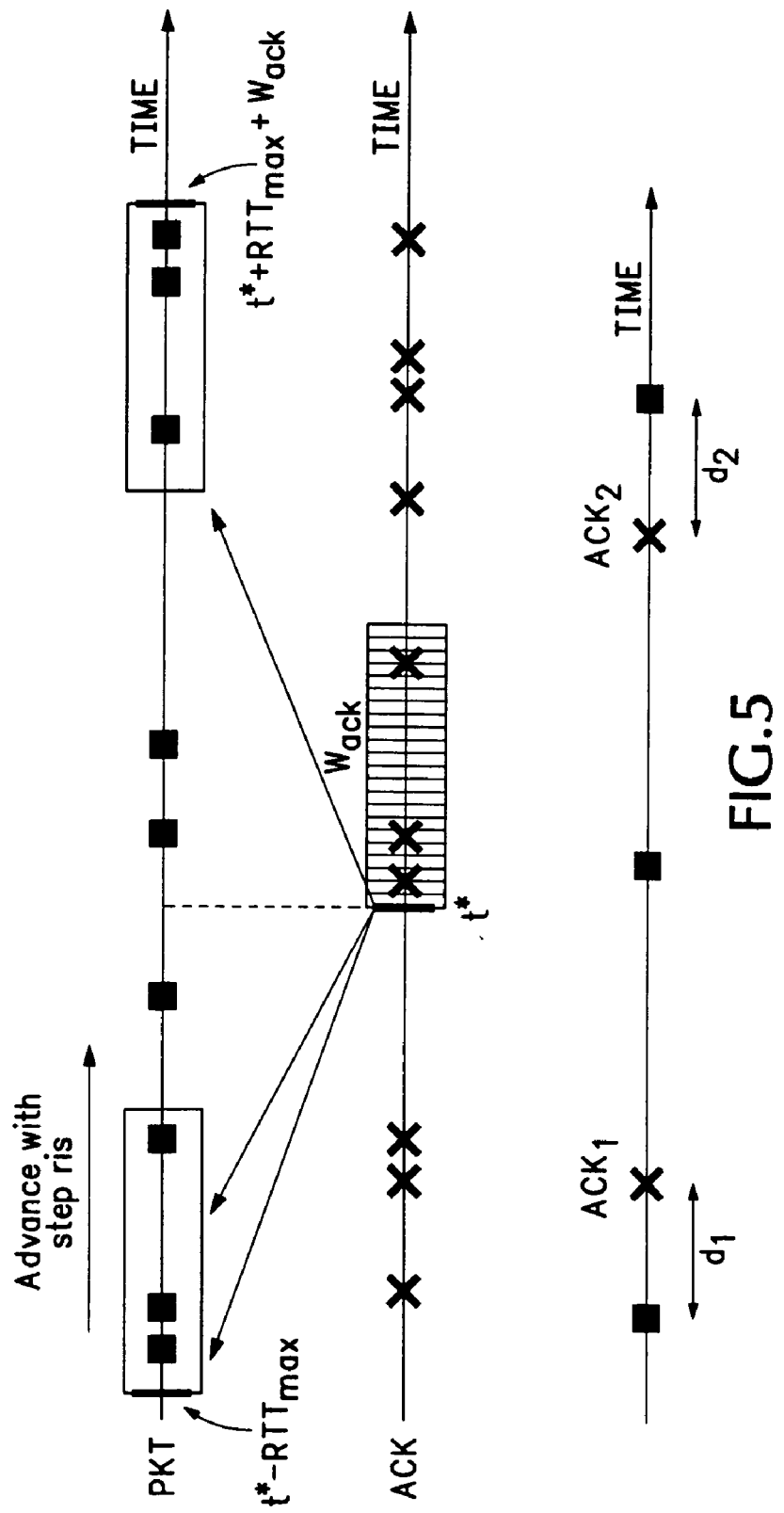
FIG. 5 is a diagrammatic view illustrating timestamp distance computation according to the present invention.

This operation may be performed directly considering the left side of FIG. 5. In fact to evaluate RTTpr it is necessary to find acknowledgments and packets with the same sequence numbers.

Unfortunately the relationship between the sequence numbers of the considered acknowledgments and the sequence numbers of packets released at the sender side is related to the congestion window used by the TCP sender (right side of FIG. 5). In this case a congestion window estimator is implemented and the estimated value used as offset for the acknowledgments. In pseudo-code this results in:

```
compute the congestion Window for Wack.
for n = 1 to N_ack {
  - find the packet nearest to t_moved_ack(n);
  - compute dt(n) [see above]
  - compute ds(n) as the absolute value of the difference between the
    sequence    number of the acknowledgment considered plus the
    congestion window    estimated;
}
DS(i) = sqrt(sum(square(ds(n))))/N_ack
```

To estimate RTTps correctly this procedure is implemented for the right side of FIG. 5.

For estimation of the congestion window the TCP sender continuously adapts the congestion window as a function of network congestion. As already stated cwnd represents the number of packets not already acknowledged by the receiver, and its upper bound is regulated by the advertised window, advwnd. This sliding window solution implemented by standard TCP improves throughput, but has to be adaptive to meet network congestion status. Different implementations of TCP senders try to adapt the congestion window using different techniques. Basically acknowledgments give information regarding packet loss and delay along the network. Using this information, different adaptation rules are used.

The described estimator tracks packets and acknowledgments at an intermediate point. It easily evaluates the number of packets not already acknowledged at the probe-receiver side. This number, called apparent window, is used as a minimum value for the congestion window estimated. In case of packet loss its value could overcome the congestion window. Therefore this lower bound cannot always be used.

The estimator follows simple rules of increasing and decreasing the window, and tracks the whole connection. A simple version containing the fundamental steps is described below:

```
for all acknowledgments {
  if the considered acknowledgment identifies a packet loss:
    then [MD phase]
      cwnd(t + 1) = cwdn(t)/2
    else [AI phase]
```

-continued

```
    cwnd(t + 1) = cwnd(t) + 1/cwnd(t)
}
``` where the MD phase (Multiplicative Decrease) is applied when packet loss is occurring and the AI phase (Additive Increase) is performed when acknowledgments with new sequence numbers are received.

Figure 6:
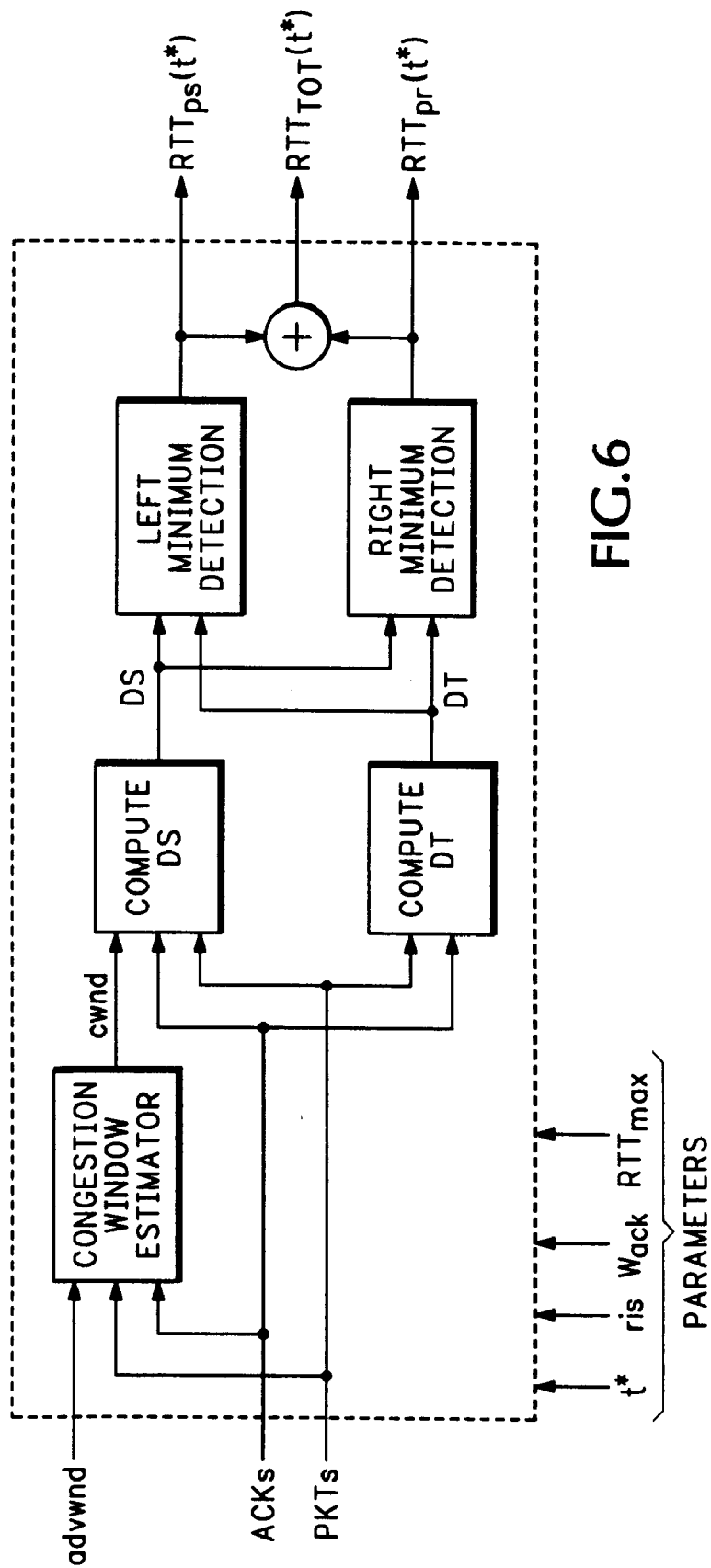
FIG. 6 is a block diagram view for the estimation of RTT according to the present invention.
Figure 7:
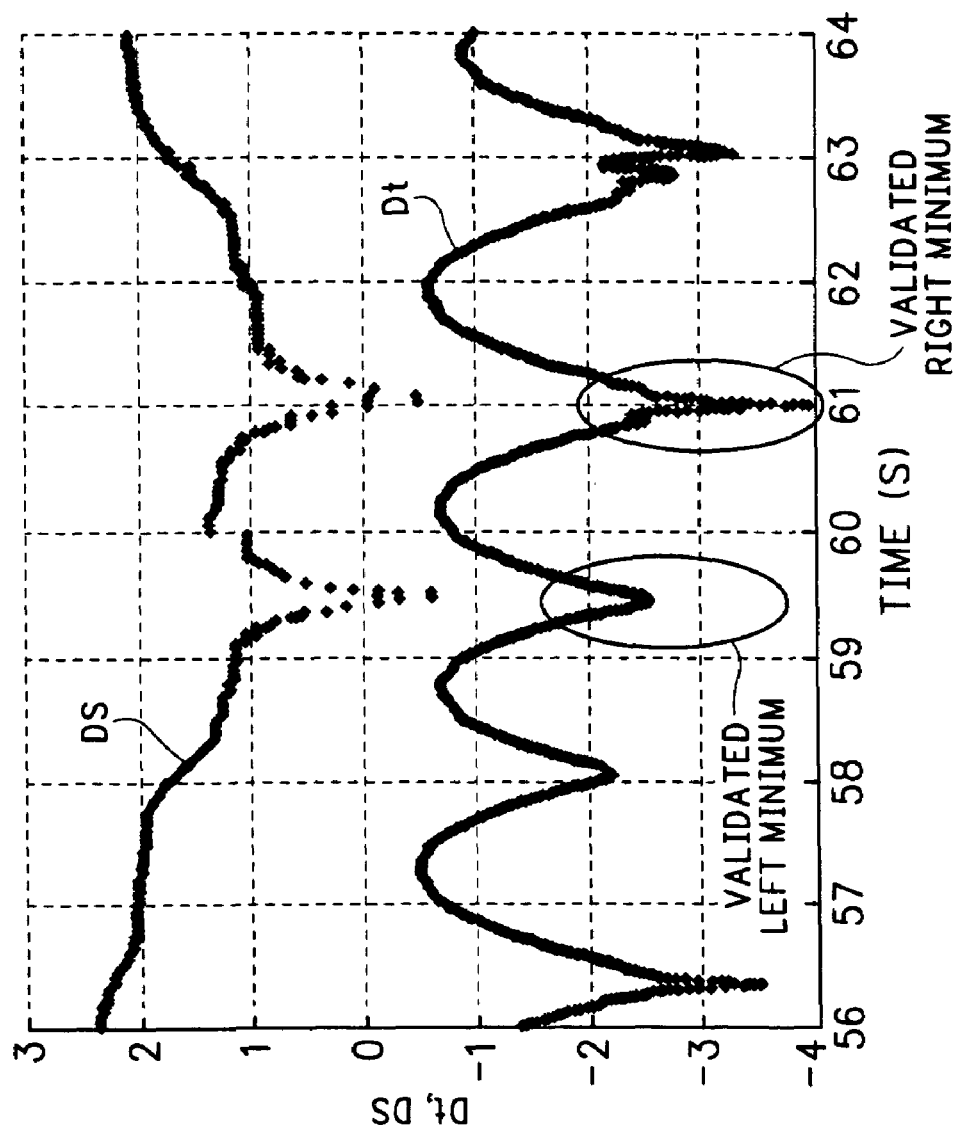
FIG. 7 is a graphic view illustrating minimums validation according to the present invention.
Figure 8:
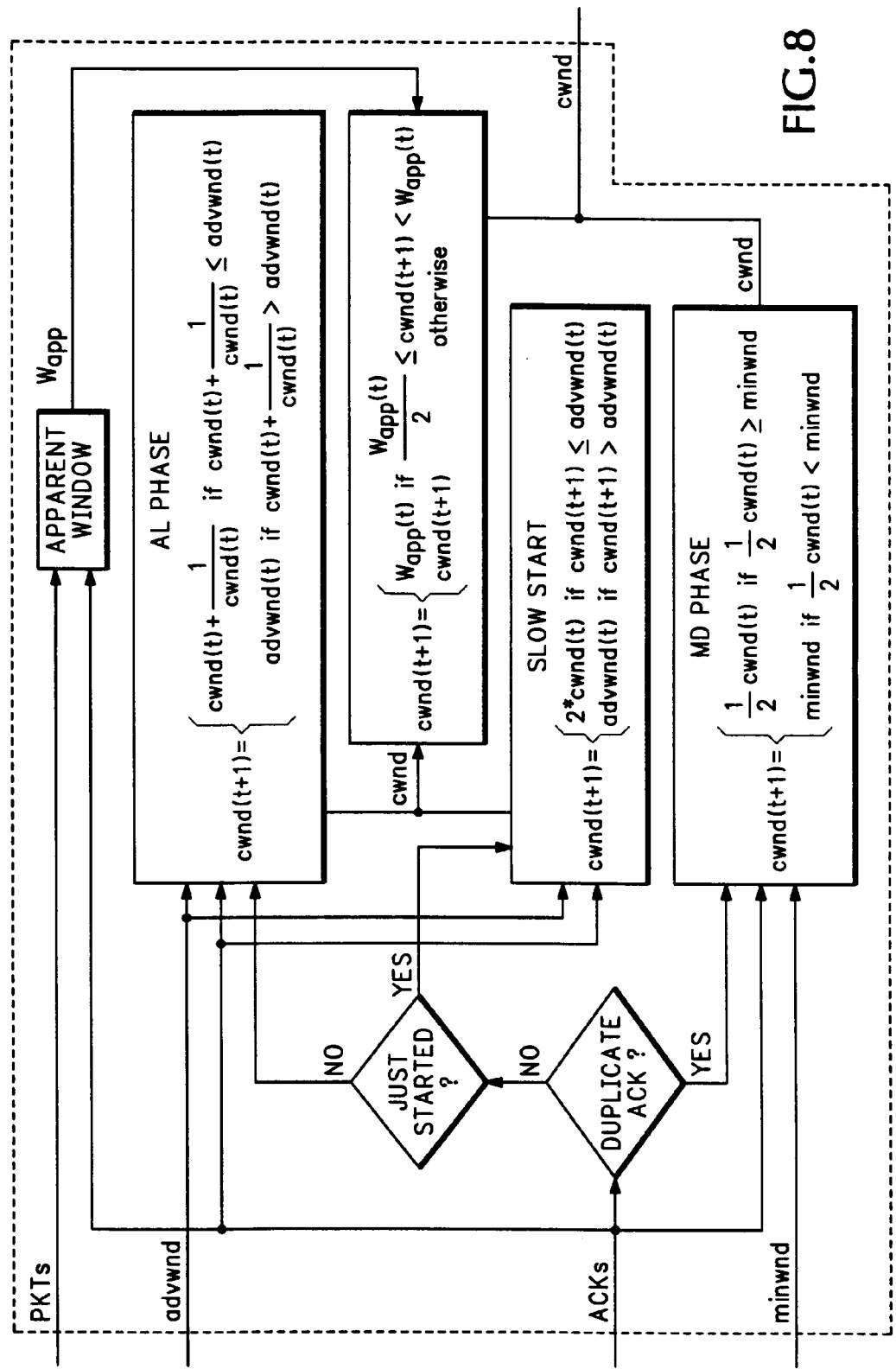
FIG. 8 is a block diagram view illustrating estimation of a sliding window according to the present invention.

The simple algorithm described here is introduced to explain the main blocks implemented. To solve some problems related to different TCP implementors and different link behaviors, some additional blocks are added. A complete outline of the algorithm is shown in FIG. 8. As shown all estimated values are clipped to the advertised window, the maximum allowable value. Another minimum value for the congestion window, minwind, is also used in the case of packet loss (duplicate ack detected). Typically minwind is set to 1 and is inserted in order to clip estimated values to a correct lower bound. At the beginning of a connection the estimator starts doubling the congestion window for each acknowledgment received (Slow Start Block) instead of executing the AI phase. This allows a closer estimation of cwnd during the beginning of the connection. In this case the sender increases rapidly its congestion window using the slow start algorithm (see Requests for Comments). As described above the limit provided by the apparent window is not always reliable. Therefore its value is used only if it is not too far from the estimated value obtained—see the block inserted after the AI phase and the Slow Start. Mean RTT for the acknowledgments contained in Wack is evaluated calculating DT and DS in both directions. The estimated congestion window is used to calculate DS for the probe-sender side. Finally two minimums for DT are searched in order to obtain RTTpr and RTTps. Correct minimum positions for DTare obtained analyzing DS. FIG. 6 depicts the complete algorithm that is iterated in order to track RTT during a complete TCP connection. FIG. 7 shows an example of how DTminimums are validated using DS.

Finally the algorithm performs continuous monitoring of RTT and Congestion Window of TCP/IP connections and may be applied, as an example, to GPRS traffic. In this case possible access points are intermediate interfaces such as Gi, Gn and Gb. Distances along timestamps and sequence numbers are determined, using part of the information contained in TCP headers of acknowledgments and packets. The algorithm works equally well in ordinary IP networks as well as more complex networks, such as GPRS and UMTS (Universal Mobile Telecommunication System), and on different packet oriented transmission systems.

What is claimed is:

1. A method of non-invasive estimation of round trip time between a sender and a receiver in a packet-oriented acknowledge-based transmission system using a probe to monitor signals transmitted between the sender and receiver during a connection comprising the steps of:
presetting a number of acknowledgments in a sequence of acknowledgments received by the probe within an acknowledgment time interval for analysis;
comparing timestamps of the preset number of acknowledgments with timestamps of packets received by the probe during a time period before the sequence of acknowledgments to determine an estimated value for a round trip time between the probe and the receiver;
comparing the timestamps for the preset number of acknowledgments with timestamps of packets received by the probe during a time period after the sequence of acknowledgments to determine an estimated value for a round trip time between the probe and the sender; and
adding the estimated values to estimate the round trip time between the sender and the receiver.

2. The method according to claim 1 wherein in the first comparing step the time period comprises a point in time of an earliest one of the preset number of acknowledgments minus a maximum round trip time.

3. The method according to claim 1 wherein in the second comparing step the time period comprises a point in time of an earliest one of the preset number of acknowledgments plus the acknowledgment time interval plus a maximum round trip time.

4. The method according to claim 2 wherein in the second comparing step the time period comprises the point in time of the earliest one of the preset number of acknowledgments plus the acknowledgment time interval plus the maximum round trip time.

5. The method according to any of claims 1-4 wherein the acknowledgment time interval comprises n discrete points in time that are spaced apart by a resolution time interval and wherein each comparing step further comprises the steps of:
finding one of the packets that is nearest in time to one of the preset number of acknowledgments;
calculating a difference in time between the one of the preset number of acknowledgments and the one packet;
iterating the finding and calculating steps for each of the preset number of acknowledgments to provide the difference in time for each of the preset number of acknowledgments;
determining a mean difference in time from the differences in time;
moving the timestamps of the preset number of acknowledgments by the resolution step;
repeating the finding, calculating, iterating, determining and moving steps until the moved timestamps reach an end of the acknowledgment time interval; and
searching for a minimum mean difference in time from among the mean differences in time.

6. The method according to claim 5 wherein the estimated value comprises an iteration number corresponding to the minimum mean difference in time multiplied by the resolution step.

7. The method according to claim 6 further comprising the step of determining sequence numbers of the packets and sequence numbers of the preset number of acknowledgments.

8. The method according to claim 7 further comprising the steps of:
finding one of the packets that is nearest in time to one of the preset number of acknowledgments;
calculating a difference in sequence numbers between the one of the preset number of acknowledgments and the sequence number of the one packet;
iterating the finding and calculating steps for each of the preset number of acknowledgments to provide the difference in sequence number for each of the preset number of acknowledgments;
determining a mean difference in sequence numbers;
moving the timestamps of the preset number of acknowledgments by the resolution step;
repeating the finding, calculating, iterating, determining and moving steps until the moved timestamps reach the end of the acknowledgment time interval; and searching for a minimum mean difference in sequence numbers from among the means differences in sequence numbers.

9. The method according to claim 8 wherein an estimated sliding window is used in the difference in sequence numbers calculating step.

10. The method according to claim 9 wherein a lower limit for the estimated sliding window comprises an apparent window where the apparent window corresponds to a number of packets for which an acknowledgment has not yet been received by the probe.

11. The method according to claim 9 wherein a lower limit for the estimated sliding window comprises one if a packet loss is detected.

12. The method according to claim 9 wherein the estimated sliding window in the case of a packet loss comprises cwnd(t+1)=cwnd(t)/2 where cwnd(t) is the estimated sliding window at a given time t.

13. The method according to claim 12 wherein the estimated sliding window in the case of receiving acknowledgments with new sequence numbers comprises cwnd(t+1)=cwnd(t)+1/cwnd(t).

14. The method according to claim 13 wherein the estimated sliding window comprises an advertised window in the case where cwnd(t+1) is greater than the advertised window, the advertized window being a preset configuration parameter.

15. The method according to claim 14 wherein at the beginning of the connection the estimated sliding window is doubled for each acknowledgment received by the probe.

16. The method according to claim 14 wherein the estimated sliding window is doubled for each acknowledgment received by the probe until a packet loss is detected.

17. The method according to claim 8 further comprising for the time periods both before and after the sequence of acknowledgments the steps of:

determining a minima from the mean differences in sequence numbers;

determining a minima from the mean differences in time that is near the minima from the mean difference in sequence numbers; and determining a point in time before and after the sequence of acknowledgments where the minimum of the mean differences in time is nearest to the minimum of the mean differences in sequence numbers.

18. The method according to claim 17 wherein the round trip times between the probe and sender and between the probe and receiver are determined by subtracting the point in time of the earliest one of the preset number of acknowledgments from the point in time after the point in time of the earliest one of the preset number of acknowledgments and by subtracting the point in time before the point in time of the earliest one of the preset number of acknowledgments from the point in time of the earliest one of the preset number of acknowledgments respectively.

* * * * *